United States Patent
Fujimoto et al.

(10) Patent No.: US 9,839,174 B2
(45) Date of Patent: Dec. 12, 2017

(54) WORK VEHICLE COOPERATION SYSTEM

(71) Applicant: Kubota Corporation, Osaka-shi (JP)

(72) Inventors: Yoshitomo Fujimoto, Sakai (JP); Hiroyuki Araki, Sakai (JP); Yasuhisa Uoya, Sakai (JP)

(73) Assignee: Kubota Corporation, Osaka (JP)

( * ) Notice: Subject to any disclaimer, the term of this patent is extended or adjusted under 35 U.S.C. 154(b) by 78 days.

(21) Appl. No.: 14/774,266

(22) PCT Filed: Mar. 19, 2015

(86) PCT No.: PCT/JP2015/058226
§ 371 (c)(1),
(2) Date: Sep. 10, 2015

(87) PCT Pub. No.: WO2015/146777
PCT Pub. Date: Oct. 1, 2015

(65) Prior Publication Data
US 2016/0120095 A1    May 5, 2016

(30) Foreign Application Priority Data

Mar. 27, 2014   (JP) ................................. 2014-067007

(51) Int. Cl.
*G01C 22/00*    (2006.01)
*G05D 1/00*     (2006.01)
(Continued)

(52) U.S. Cl.
CPC ......... *A01B 69/008* (2013.01); *G05D 1/0295* (2013.01); *G05D 2201/0201* (2013.01)

(58) Field of Classification Search
None
See application file for complete search history.

(56) References Cited

U.S. PATENT DOCUMENTS

| 6,052,647 A | 4/2000 | Parkinson et al. |
| 6,148,255 A | 11/2000 | van der Lely |

(Continued)

FOREIGN PATENT DOCUMENTS

| JP | 1139036 A | 2/1999 |
| JP | 200014208 A | 1/2000 |
| JP | 2001-507843 A | 6/2001 |

*Primary Examiner* — Bhavesh V Amin
(74) *Attorney, Agent, or Firm* — The Webb Law Firm (57) ABSTRACT

A work vehicle cooperation system includes: a master traveling track calculation unit that calculates a traveling track of a master work vehicle (1P) based on a detection position at which the master work vehicle (1P) was detected; a slave traveling target calculation unit that calculates a target traveling position of the slave work vehicle (1C) based on the traveling track of the master work vehicle (1P); a master parameter generation unit that generates a master work/driving parameter relating to work/driving executed by the master work vehicle (1P), the master work/driving parameter being linked with the detection position; a slave parameter generation unit that generates a slave work/driving parameter for the slave work vehicle (1C) based on the master work/driving parameter, the slave work/driving parameter being linked with the target traveling position for the slave work vehicle (1C); and a navigation control unit that navigates the slave work vehicle in an unmanned manner based on a detection position of the slave work vehicle (1C), the target traveling position, and the slave work/driving parameter.

7 Claims, 8 Drawing Sheets

(51) Int. Cl.
*A01B 69/04* (2006.01)
*G05D 1/02* (2006.01)

(56) References Cited

U.S. PATENT DOCUMENTS

| | | |
|---|---|---|
| 6,732,024 B2 | 5/2004 | Wilhelm Rekow et al. |
| 2002/0165649 A1* | 11/2002 | Wilhelm Rekow .. A01B 69/008 701/26 |
| 2011/0112730 A1 | 5/2011 | Rekow |
| 2016/0109885 A1* | 4/2016 | Fujimoto ............. G05D 1/0219 701/23 |
| 2016/0120095 A1* | 5/2016 | Fujimoto ............. A01B 69/008 701/24 |

* cited by examiner

WORK VEHICLE COOPERATION SYSTEM

CROSS-REFERENCE TO RELATED APPLICATIONS

This application is the United States national phase of International Application No. PCT/JP2015/058226 filed Mar. 19, 2015, and claims priority to Japanese Patent Application No. 2014-067007 filed Mar. 27, 2014, the disclosures of which are hereby incorporated in their entirety by reference.

TECHNICAL FIELD OF THE INVENTION

The present invention relates to a work vehicle cooperation system that coordinates a master work vehicle (parent work vehicle) and an unmanned-navigation type slave work vehicle (child work vehicle) that travels to perform ground work while emulating ground work performed by this master work vehicle.

BACKGROUND OF THE INVENTION

A vehicle control system that sequentially determines target traveling positions based on the actual traveling position of a master work vehicle and navigates a slave work vehicle toward the target traveling positions is known from Patent Document 1. In this vehicle control system, control modes are disclosed, such as one in which the slave work vehicle is controlled to follow the master work vehicle so as to maintain offset amounts in X (longitude) and Y (latitude) directions set for the master work vehicle, and one in which the slave work vehicle is controlled to follow the master work vehicle, using a traveling route that is obtained by translating a traveling track of the master work vehicle by the work width as a target traveling route. Here, the traveling positions of the work vehicles are acquired using GPS (Global Positioning System). A technique for controlling unmanned navigation of a tractor based on traveling position information using GPS is described in detail in Patent Document 2.

The following control of Patent Document 1 is intended for work performed on work ground with a large area, rather than for traveling in a complicated route on work ground such as a field with a relatively small area that is bounded by a ridge or the like. In work traveling performed on such a field and the like, it is necessary not only to perform redirection of 180 degrees or 90 degrees but also to repeatedly perform traveling-system operations such as deceleration, acceleration, stopping, and starting. Furthermore, depending on the type of work traveling, it is also required to repeatedly perform work-system operations such as driving and stopping of a work implement, and raising and lowering of the work implement. For example, rice or wheat reaping work in a small agricultural field is performed using back and forth traveling in which vehicles travel while repeatedly performing straight work traveling and U-turns in the central area of the agricultural field, and loop traveling in which the vehicles perform work while traveling in a loop in a loop work area, which is defined as the perimeter of the U-turn work area. Accordingly, the agricultural field is divided in advance into the U-turn work area and the loop work area, and in each of the areas, the traveling-system operations and the work-system operations are frequently performed. However, it is difficult to realize such non-simple work traveling with a conventional system for performing work and traveling on work ground with a large area using predetermined traveling-system operations and work-system operations.

PRIOR ART LITERATURE

Patent Documents

Patent Document 1: U.S. Pat. No. 6,732,024 (U.S. Pat. No. 6,732,024 B2)
Patent Document 2: U.S. Pat. No. 6,052,647 (U.S. Pat. No. 6,052,647 B2)

SUMMARY OF THE INVENTION

Problem to be Solved by the Invention

There has been a demand for a work vehicle cooperation system according to the present invention in which a slave work vehicle can emulate work traveling of a master work vehicle in which traveling-system operations and work-system operations are frequently performed.

Means for Solving Problem

A system according to the present invention relates to a work vehicle cooperation system in which a master work vehicle and an unmanned-navigation type slave work vehicle that emulates the master work vehicle perform ground work using a work implement, including: a master position detection module that detects a master position, which is a position of the master work vehicle; a slave position detection module that detects a slave position, which is a position of the slave work vehicle; a master traveling track calculation unit that calculates a traveling track of the master work vehicle based on the master position; a slave traveling target calculation unit that calculates a target traveling position of the slave work vehicle based on the traveling track of the master work vehicle; a master parameter generation unit that generates a master work/driving parameter relating to work/driving executed by the master work vehicle, the master work/driving parameter being linked with the master position; a slave parameter generation unit that generates a slave work/driving parameter for the slave work vehicle based on the master work/driving parameter, the slave work/driving parameter being linked with the corresponding target traveling position of the slave work vehicle; and a navigation control unit that navigates the slave work vehicle in an unmanned manner based on the slave position, the target traveling position, and the slave work/driving parameter.

According to this configuration, since a master work/driving parameter relating to work/driving executed by the master work vehicle is linked with the position of the master work vehicle, the position of the master work vehicle in work traveling at which a specific operation is made during the work traveling is understood based on this master work/driving parameter. In other words, it is possible to understand which operation is to be performed at a specified traveling position. Based on this master work/driving parameter, a slave work/driving parameter for the slave work vehicle that is linked with the corresponding target traveling position of the slave work vehicle is generated. In this case, this slave work/driving parameter is generated as data indicating the operation content that is to be executed at the target traveling position of the slave work vehicle. Therefore, by navigating the slave work vehicle based on the work/driving parameter, the slave position, the target traveling position, and the slave work vehicle, work/driving of the slave work vehicle that reliably emulates the work/driving of the master work vehicle is realized.

In a work vehicle that works while traveling, there are cases where traveling-related operations such as deceleration, acceleration, stopping, and starting are important, and cases where work implement-related operations such as driving and stopping of a work implement and raising/lowering of the work implement are important, and cases where both types of operations are important, depending on the type of work. Accordingly, in a preferred embodiment of the present invention, the work/driving parameter includes a traveling control parameter that relates to an operation of a traveling system including a gearbox and braking device, and/or, a work control parameter that relates to a working operation and a non-working operation with respect to the work implements. Accordingly, it is possible to provide a work vehicle cooperation system that is appropriate for work.

If the master work vehicle and the slave work vehicle that are used in the cooperation system have specifications that are the same and the master work vehicle and the slave work vehicle perform the same operation, the same work/driving is realized. However, if a master work vehicle and a slave work vehicle that have different specifications are used, even causing the slave work vehicle to perform the same operation as that of the master work vehicle does not necessarily have the same result. Accordingly, in a preferred embodiment of the present invention, the slave parameter generation unit is provided with a specification recording device in which a specification of the master work vehicle and a specification of the slave work vehicle are recorded, and is configured to generate the slave work/driving parameter by correcting the master work/driving parameter based on a difference between the specification of the master work vehicle and the specification of the slave work vehicle.

Particularly, in a case where the master work vehicle and the slave work vehicle perform work traveling in the same work ground in a divided manner, it is necessary to correctly take into consideration the ground work width of the master work vehicle and the ground work width of the slave work vehicle, in order to prevent work on the work ground from remaining undone. Accordingly, in a preferred embodiment of the present invention, the slave traveling target calculation unit calculates a target traveling position of the slave work vehicle based on a ground work width of the master work vehicle, a ground work width of the slave work vehicle, and the traveling track of the master work vehicle, and the navigation control unit navigates the slave work vehicle in an unmanned manner based on the target traveling position, so that the slave work vehicle follows a ground work track of the master work vehicle.

The functional units for causing the slave work vehicle to follow the preceding master work vehicle are preferably accommodated in a single control unit. For this, in a preferred embodiment of the present invention, the slave position detection module and the navigation control unit are mounted on the slave work vehicle, the master position detection module, the master traveling track calculation unit, the slave traveling target calculation unit, the master parameter generation unit, and the slave parameter generation unit are mounted on the master work vehicle, and the slave work vehicle and the master work vehicle are connected to each other so as to be capable of data transmission. According to this configuration, only slight modification is needed for the slave work vehicle, and thus the present invention is advantageous for a system that uses a plurality of slave work vehicles.

Furthermore, in another preferred embodiment, the slave position detection module and the navigation control unit are mounted on the slave work vehicle, the master position detection module and the master parameter generation unit are mounted on the master work vehicle, the master traveling track calculation unit, the slave traveling target calculation unit, and the slave parameter generation unit are constructed in a separate control unit, and the separate control unit, the slave work vehicle, and the master work vehicle are connected to one another so as to be capable of data transmission. According to this configuration, since the main functions that realize the present invention are constructed in the control unit that is separate from the work vehicles, only slight modification is needed for the master work vehicle and the slave work vehicle. By connecting the master work vehicle, the slave work vehicle, and the control unit using Wi-Fi, telephone lines, or the like so that data transmission is possible, it is possible to use the work vehicle cooperation system as a cloud system.

EMBODIMENTS OF THE INVENTION

Figure 1:
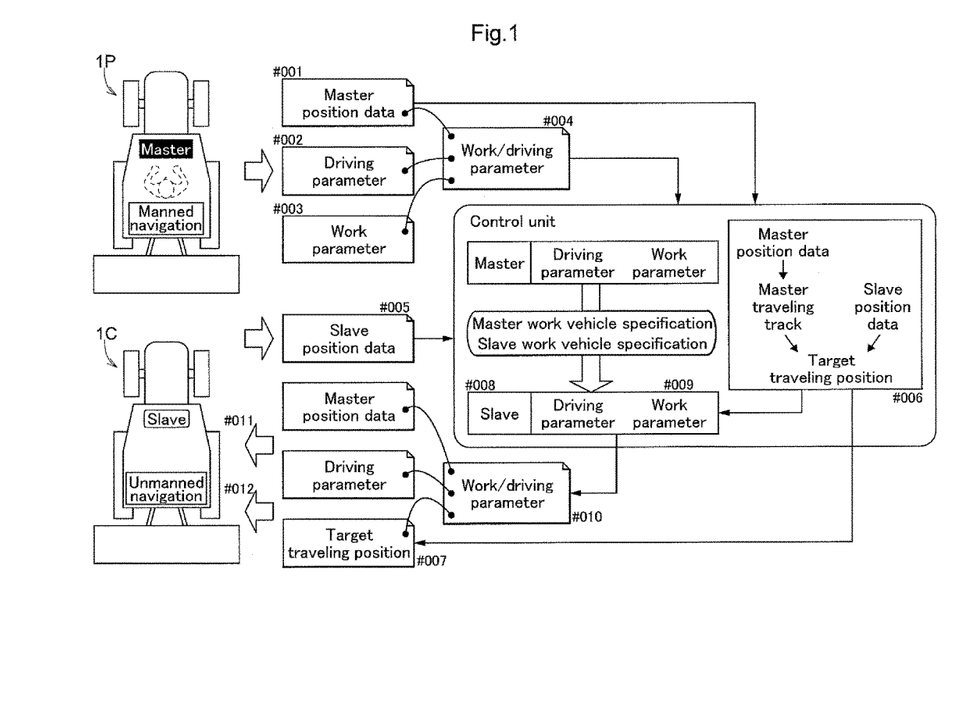
FIG. 1 is a schematic diagram illustrating a flow of data between a master work vehicle (parent work vehicle) and a slave work vehicle (child work vehicle) in a work vehicle cooperation system according to the present invention.

A basic flow of data in work traveling of a slave work vehicle (child work vehicle) 1C that emulates a master work vehicle (parent work vehicle) 1P will be described with reference to FIG. 1 before describing specific embodiments of a work vehicle cooperation system according to the present invention. In this work vehicle cooperation system, the manned-navigation type master/parent work vehicle 1P performs ground work, and the slave work vehicle 1C emulates this master work vehicle 1P to perform the same ground work in an unmanned manner.

When the master work vehicle 1P first starts work traveling, a master position, which is the current position of the master work vehicle 1P, is detected using a positioning function such as GPS as needed, and is digitalized so that the digitalized data can be transmitted (#001). Furthermore, when a driver of the master work vehicle 1P performs a traveling-system operation such as brake operation, accelerator operation, or gearshift operation, the operation content is digitalized so that the digitalized data can be transmitted as a driving parameter (#002). Furthermore, when the driver of the master work vehicle 1P performs a work-system operation, such as turning on/off operation of a power transmission clutch of a work implement, or working state/non-working state switching operation of the work implement by raising/lowering of the work implement, the operation content is digitalized so that the digitalized data can be transmitted as a work parameter (#003). The driving parameter and the work parameter are linked with the master position at the time of the operation and are handled as work/driving parameters (#004).

The slave work vehicle 1C starts after the master work vehicle 1P, and also in the slave work vehicle 1C, a slave position, which is the current position of the slave work vehicle 1C, is detected using a positioning function such as GPS as needed, and is digitalized so that the digitalized data can be transmitted (#005).

A control unit that manages cooperation control calculates a traveling track (master traveling track) of the master work vehicle 1P based on master position data that is generated and transmitted as needed. In order to cause the slave work vehicle 1C to travel so as to follow this master traveling track, a target traveling position to which the slave work vehicle 1C performs following and travels in an unmanned manner is calculated, based on the slave position data transmitted from the slave work vehicle 1C and the master traveling track. The calculated target traveling position is transmitted to the slave work vehicle 1C.

If the work/driving parameter transmitted to the control unit includes a driving parameter, the operation content of the slave work vehicle 1C that is defined by this driving parameter and is the same as the traveling-system operation that was executed in the master work vehicle 1P is derived using a conversion table generated based on a master work vehicle specification and a slave work vehicle specification that are recorded in advance. The derived traveling-system operation content is linked with a target traveling position, which is the position of the slave work vehicle 1C at which the operation is to be executed (#008). Similarly, if the work/driving parameter transmitted to the control unit includes a work parameter, the operation content of the slave work vehicle 1C that is defined by the work parameter and is the same as the work-system operation that was executed in the master work vehicle 1P is derived using the above-described conversion table. The derived work-system operation content is linked with a target traveling position, which is the position of the slave work vehicle 1C at which the operation is to be executed (#009). The traveling-system operation content and the work-system operation content that are linked with the target traveling positions are digitalized so as to be available in the slave work vehicle 1C as a work/driving parameter for use in the slave work vehicle 1C, and are transmitted to the slave work vehicle 1C (#010).

Based on the target traveling position received from the control unit, in the slave work vehicle 1C, the steering orientation is controlled so that the detected slave position matches the target traveling position (#011). Furthermore, if the work/driving parameter received from the control unit includes a driving parameter of an operation that is to be executed at the detected current traveling position (slave position) of the slave work vehicle 1C, the traveling-system operation is executed based on the driving parameter. If the work/driving parameter includes a work parameter, the work-system operation is executed based on this work parameter (#012).

Figure 2:
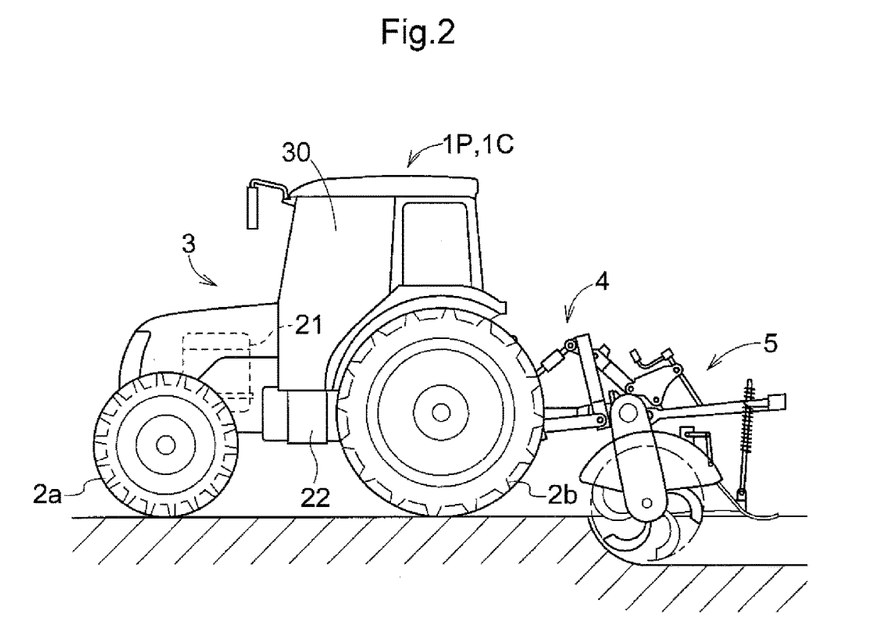
FIG. 2 is a side view of a tractor provided with a cultivation apparatus according to an embodiment of the work vehicle cooperation system, wherein the tractor serves as the work vehicle.

Hereinafter, a specific embodiment of the work vehicle cooperation system of the present invention will be described. In this embodiment, the work vehicles are, as shown in FIG. 2, tractors each provided with a cultivation apparatus 5 that serves as a ground work implement and cultivates a field bounded by a ridge. The cultivation apparatus 5 is mounted on the rear of a vehicle body 3 via a hydraulic lifting mechanism 4. Cultivation work is performed by lowering the cultivation apparatus 5, and is stopped by raising the cultivation apparatus 5. An engine 21 is mounted in the front portion of the vehicle body 3 supported by front wheels 2a and rear wheels 2b, and a gearbox 22 is mounted in the central portion of the vehicle body 3. Above the gearbox 22, a steering section 30 is formed in which an operation tool for performing a traveling-system operation such as steering orientation operation, engine operation, or gearshift operation, and an operation tool for performing a work-system operation such as raising/lowering operation of the lifting mechanism 4 are arranged. In this embodiment, the master tractor 1P serving as the master work vehicle 1P and the slave tractor 1C serving as the slave work vehicle 1C have substantially the same shape, the master tractor 1P is navigated by the driver, and the slave tractor 1C is navigated in an unmanned manner.

Figure 3:
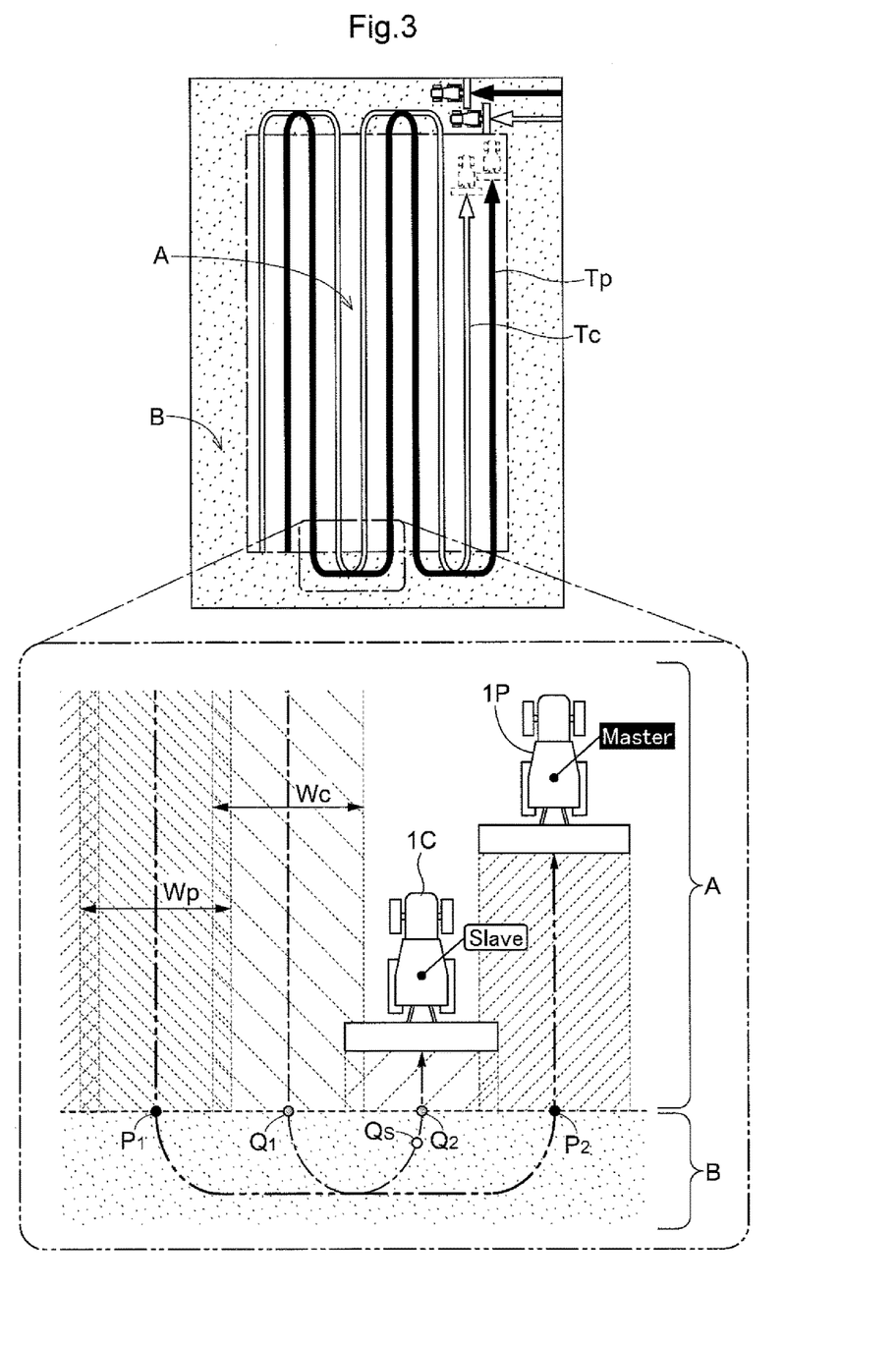
FIG. 3 is a schematic diagram illustrating traveling tracks of the master work vehicle and the slave work vehicle that repeatedly perform work traveling and U-turn traveling in a U-turn work area.
Figure 4:
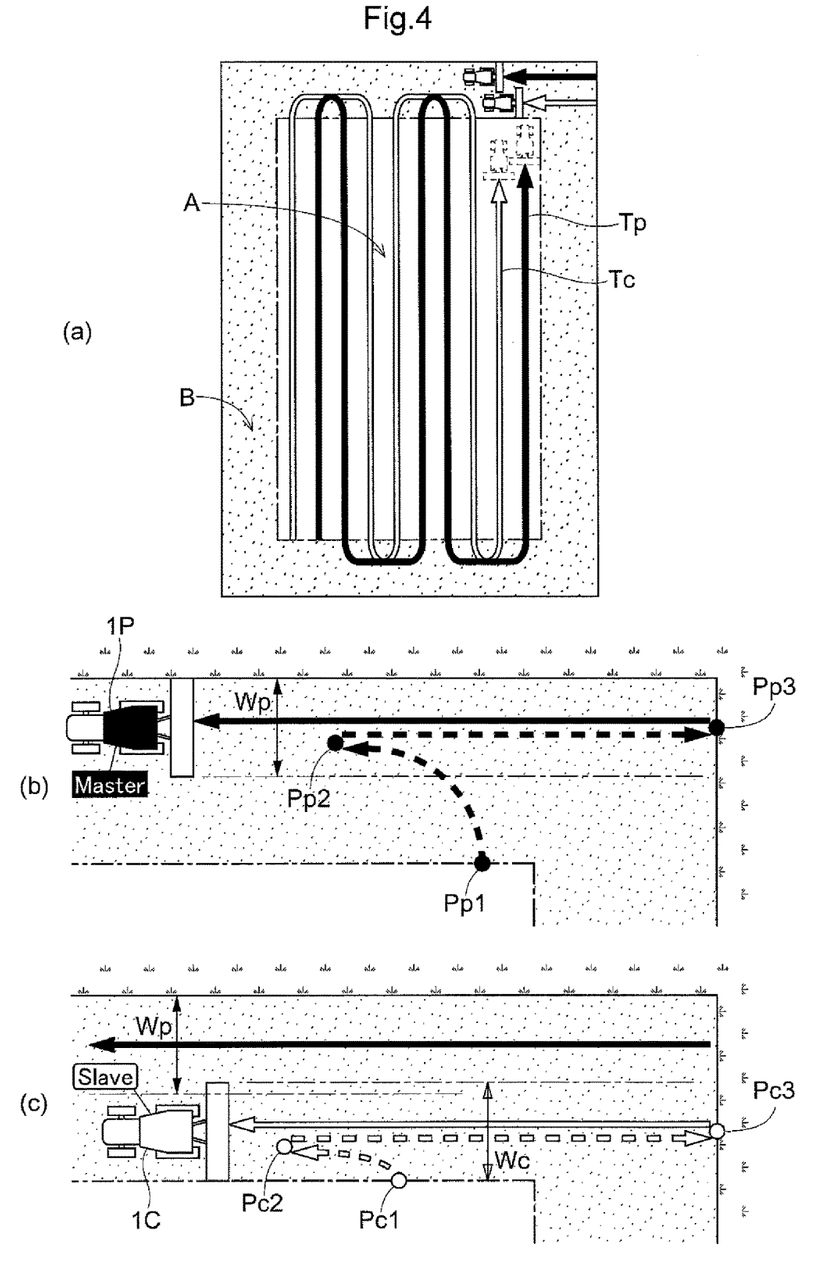
FIG. 4 illustrates schematic diagrams of a basic principle of the slave work vehicle following the master work vehicle from a U-turn work area to the loop work traveling area, wherein (a) in FIG. 4 shows traveling tracks of the master work vehicle and the slave work vehicle in the entire work ground; (b) in FIG. 4 shows traveling tracks of redirection traveling and loop work traveling of the master work vehicle; and (c) in FIG. 4 shows traveling tracks of redirection traveling and loop work traveling of the slave work vehicle.

The work ground shown in FIGS. 3 and 4 is an agricultural field that is bounded externally by a ridge. This agricultural field, although it is shown in a simplified manner, is divided into a rectangular U-turn work area A, in which work is performed by repeating straight work traveling and U-turns, and a square ring-shaped loop work area B, which is defined as the perimeter of this U-turn work area A. This work ground division is commonly made in agricultural field work, and the loop work area B is referred to also as headland area. In this example, cultivation work using tractors is taken as an example of ground work, and work with respect to the U-turn work area A is performed first and work with respect to the loop work area B is performed thereafter. Note that the loop work area B is also used as an area for non-working U-turn traveling performed at the time of cultivation work with respect to the U-turn work area A. When shifting from the work in the U-turn work area A to the work in the loop work area B, redirection traveling from the work end point in the U-turn work area A to the work start point in the loop work area B is performed in order to achieve efficient loop work in the loop work area B.

First, cooperative traveling between the master tractor 1P and the slave tractor 1C in the U-turn work area A will be described with reference to FIG. 3. In the U-turn work area A, cultivation work is performed while the straight work traveling and U-turns are repeatedly performed. Note that the U-turn work area A is simply referred to also as a central area A since the U-turn work area A is commonly located in the center of an agricultural field, and the loop work area B is simply referred to also as a peripheral area B since the loop work area B is located near the periphery of the agricultural field.

In the central area A, work traveling (substantially straight traveling) is started by the master tractor 1P in the working state in which the work implement 5 is lowered. After a predetermined time, follow work traveling is started by the slave tractor 1C in the working state in which the work implement 5 is lowered. Accordingly, cooperative cultivation work is performed with the work width of the master tractor 1P and the work width of the slave tractor 1C. In this case, an amount of offset between the positions of the master tractor 1P and the slave tractor 1C in the direction perpendicular to the traveling direction is given as "(the master work width+the slave work width)/2" ideally; but, for example, an overlap of about several tens of centimeters is set in order to prevent the ground from remaining uncultivated due to an error in following. As show in FIG. 3, when the master tractor 1P arrives at the peripheral area B from the central area A, the cultivation apparatus 5 is raised and U-turn traveling of the master tractor 1P is started. The position of the master tractor 1P at that point of time is recorded as a master U-turn start point P1. When the master tractor 1P has performed U-turn traveling and enters the central area A again, the cultivation apparatus 5 is lowered and work traveling of the master tractor 1P is restarted. The position of the master tractor 1P at that point of time is recorded as a master U-turn end point P2. When the master U-turn start point P1 and the master U-turn end point P2 have been recorded, a slave U-turn start point Q1 and a slave U-turn end point Q2 of the slave tractor 1C are calculated. In the shown corresponding peripheral area B, the slave U-turn start point Q1 is a position that is shifted from the master U-turn start point P1 with consideration given to a distance in the lateral direction between the master tractor 1P and the slave tractor 1C and an amount of overlap therebetween. The slave U-turn end point Q2 is a position between the master U-turn end point P2 and the slave U-turn start point Q1, and is assumed to be an intermediate position in the example of FIG. 3. Note that, when performing a U-turn on the opposite side, although it is not shown, the positional relationship between the master U-turn start point P1/the master U-turn end point P2, and the slave U-turn start point Q1/the slave U-turn end point Q2 is exactly opposite, and the slave U-turn end point Q2 is a position located further outward than the master U-turn end point P2, and is obtained based on the cultivation widths of the master tractor 1P and the slave tractor 1C and the amount of overlap therebetween. When the slave U-turn start point Q1 and the slave U-turn end point Q2 have been calculated, a slave U-turn traveling route from the slave U-turn start point Q1 to the slave U-turn end point Q2 is calculated. Furthermore, the position at which the slave tractor 1C has almost reached an orientation in the work traveling direction before the slave U-turn end point Q2 is calculated as a follow start point Qs. That is, this follow start point Qs is a position at which following the master tractor 1P is started, so that the work traveling track of the slave tractor 1C starting from the U-turn end point Q2 exactly corresponds to the work traveling track of the master tractor 1P.

When the slave tractor 1C arrives at the slave U-turn start point Q1, the work implement 5 is raised and U-turn traveling of the slave tractor 1C in the non-working state is started. In the U-turn traveling of the slave tractor 1C, it is checked whether or not the slave tractor 1C has arrived at the follow start point Qs. If the slave tractor 1C has arrived at the follow start point Qs, the U-turn traveling of the slave tractor 1C ends, the work implement 5 is raised, and follow traveling, that is, work traveling of the slave tractor 1C in the working state is restarted. The cultivation work in the central area A is completed in such a manner by repeating the work traveling (substantially straight traveling) in the central area A and the non-work traveling (U-turn traveling) in the peripheral area B.

The following will describe cooperative traveling between the master tractor 1P and the slave tractor 1C in the loop work area B with reference to FIG. 4. Note that in FIG. 4, distinction is made such that the traveling track of the master tractor 1P is denoted by the bold black line, the traveling track of the slave tractor 1C is denoted by the bold white line, and the redirection traveling track is denoted by dotted lines. Furthermore, in FIG. 4, the ground work widths of the master tractor 1P and the slave tractor 1C are respectively denoted by "Wp" and "Wc".

First, the master tractor 1P starts in the non-working state (with the cultivation apparatus raised) from a redirection traveling start point Pp1, which serves as the work end point in the central area (U-turn work area) A, and travels forward while turning so that the rear end of the tractor faces a loop work start point (serving also as a redirection traveling end point) Pp3 that is set at one corner section of the agricultural field. The master tractor 1P is stopped at a redirection point Pp2 at which the rear end of the tractor faces the redirection traveling end point Pp3, then travels backward to arrive at the loop work start point Pp3, which serves as the redirection traveling end point, and ends the redirection traveling. When the redirection traveling is completed, the master tractor 1P travels forward in the peripheral area (loop work area) B in the working state (with the cultivation apparatus 5 lowered). This loop work traveling is performed so as to create a substantially straight traveling track.

When it is detected that the master tractor 1P has performed the redirection traveling based on the above-described traveling track of the master tractor 1P, a redirection traveling start point Pc1 and a redirection traveling end point Pc3 of the slave tractor 1C are calculated, based on the traveling track and the ground work widths (hereinafter, abbreviated simply as "work widths") of the master tractor 1P and the slave tractor 1C. When the redirection traveling start point Pc1 and the redirection traveling end point Pc3 have been calculated, a stop point (redirection point) Pc2 of the turning and forward traveling in the same direction as that of the redirection traveling of the master tractor 1P is also calculated, and the slave tractor 1C is caused to travel forward while turning in the non-working state to this stop point Pc2. In this case, the slave tractor 1C is prohibited from turning and traveling forward until interference with the master tractor 1P that is performing the loop work traveling is prevented. The target traveling position in the backward traveling of the slave tractor 1C from the stop point Pc2 of the turning and forward traveling to the redirection traveling end point Pc3 is calculated irrespective of the traveling track of the turning and backward traveling of the master tractor 1P, under the condition that the rut of the slave tractor 1C does not enter the loop work width of the master tractor 1P. The target traveling position of the loop work traveling from the loop work traveling start point, which serves also as the redirection traveling end point Pc3, is calculated based on the work width of the master tractor 1P, the work width of the slave tractor 1C, and the loop work traveling track of the master tractor 1P, under the condition that a predetermined overlap in the work width of both tractors is maintained. The work implement 5 is lowered, prior to the loop work traveling that is started at the loop work traveling start point, which serves as the redirection traveling end point Pc3. Since the target traveling positions in the loop work traveling are calculated, loop work traveling of the slave tractor 1C is executed in the working state in which the work implement 5 is lowered based on the target traveling positions. The cultivation work in the loop work area B is completed in such a manner by repeating the redirection traveling, which is constituted by forward traveling and backward traveling, and the loop work traveling, which is constituted by straight forward traveling.

Figure 5:
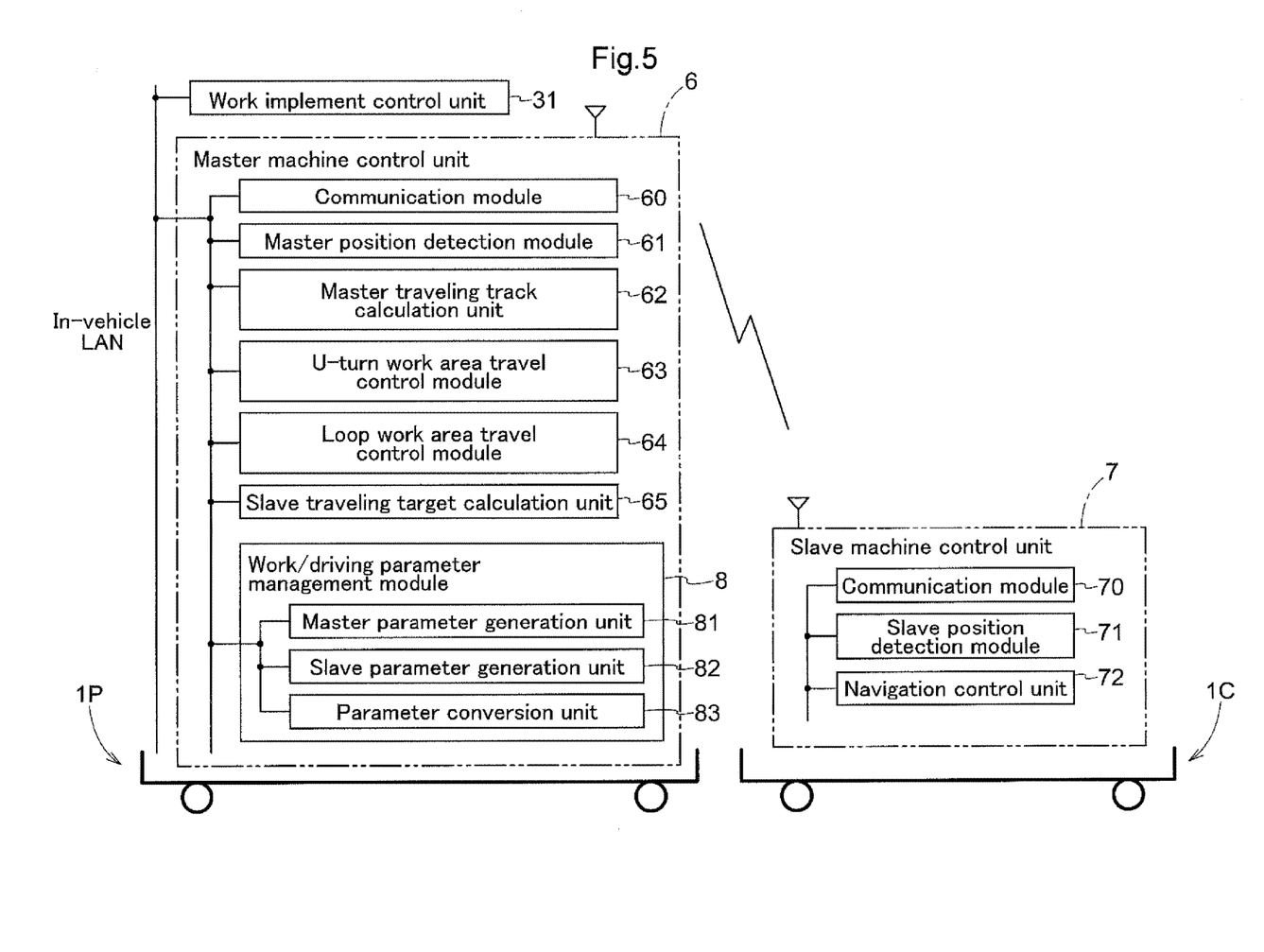
FIG. 5 is a functional block diagram illustrating control function units constituting the work vehicle cooperation system.

As shown in FIG. 5, in this embodiment, an electronic control unit for configuring the work vehicle cooperation system is divided into a master machine control unit 6, which is mounted on the master tractor 1P, and a slave machine control unit 7, which is mounted on the slave tractor 1C. The master machine control unit 6 and the slave machine control unit 7 are respectively provided with communication modules 60 and 70 so as to be capable of wireless data transmission with each other.

The master machine control unit 6 further includes functional units such as a master position detection module 61, a master traveling track calculation unit 62, a U-turn work area travel control module 63, a loop work area travel control module 64, a slave traveling target calculation unit 65, and a work/driving parameter management module 8. These functional units may operate in cooperation with hardware, but are realized substantially by activation of computer programs.

The master position detection module 61 uses GPS to detect its own position, that is, the position of the master tractor 1P. The master traveling track calculation unit 62 calculates the traveling track of the master tractor 1P based on the position detected by the master position detection module 61, and records the calculated traveling track.

The U-turn work area travel control module 63 is a control module for controlling traveling in the U-turn work area A. The U-turn work area travel control module 63 has the following functions:

(1) Recording positional coordinates for specifying the outer shape of the U-turn work area A, in order to indicate allocation of the loop work area B in an agricultural field, but this recording is not essential and may be omitted;
(2) Detecting U-turns in the loop work area, in which U-turns in the non-working state are made, the U-turns being needed between substantially straight back traveling and forth traveling of the master tractor 1P and the slave tractor 1C in the working state in the U-turn work area;
(3) Calculating a target traveling route of the slave tractor 1C in the U-turn work area A, based on the cultivation width of the master tractor 1P, the cultivation width of the slave tractor 1C, the work traveling track of the master tractor 1P, and the position of the slave tractor 1C, taking into consideration also an overlap in the cultivation width of both tractors. The target traveling route of the slave tractor 1C in the U-turn work area A includes straight back and forth traveling routes of the slave tractor 1C in the U-turn work area, and a U-turn traveling route of the slave tractor 1C in the loop work area that is calculated according to a predetermined U-turn traveling route calculation algorithm.

The loop work area travel control module 64 is a control module for controlling traveling in the loop work area B. The loop work area travel control module 64 has the following functions:

(1) Detecting redirection traveling, which is constituted by forward traveling and backward traveling, and loop traveling, which includes loop work traveling, of the master tractor 1P and the slave tractor 1C in the loop work area B. For the detection, positional coordinates for specifying the outer shape of the U-turn work area A, and positional coordinates for specifying the outer shape of the agricultural field that is a target for work are used.
(2) Calculating a target traveling track of the redirection traveling of the slave tractor 1C that includes the redirection traveling start point Pc1 and the redirection traveling end point Pc3, based on the work width of the master tractor 1P, the work width of the slave tractor 1C, and the redirection traveling track of the redirection traveling of the master tractor 1P that includes the redirection traveling start point Pp1 and the redirection traveling end point Pp3;
(3) Calculating a target traveling route of the loop work traveling of the slave tractor 1C from the redirection traveling end point Pc3 to the next redirection traveling start point Pc1, based on the work width of the master tractor 1P, the work width of the slave tractor 1C, and the loop work traveling track of the master tractor 1P.

The slave traveling target calculation unit 65 cooperates with the U-turn work area travel control module 63 and the loop work area travel control module 64 to calculate the target traveling position of the slave tractor 1C based on the traveling track of the master tractor 1P. The slave traveling target calculation unit 65 transmits the calculated target traveling position of the slave tractor 1C to the slave machine control unit 7 via the communication module 60.

The work/driving parameter management module 8 realizes transfer of the parameters regarding a traveling-system operation and a work-system operation between the master tractor 1P and the slave tractor 1C, as described with reference to FIG. 1. Therefore, the work/driving parameter management module 8 includes a master parameter generation unit 81, a slave parameter generation unit 82, and a parameter conversion unit 83. The master parameter generation unit 81 generates a master work/driving parameter relating to work/driving that was executed by the master tractor 1P such that it is linked with the master position detected by the master position detection module. Based on the master work/driving parameter, the slave parameter generation unit 82 generates a slave work/driving parameter that is linked with the corresponding target traveling position of the slave tractor 1C. Note that if the master tractor 1P and the slave tractor 1C have specifications that are completely the same, the master work/driving parameter can be used directly as the slave work/driving parameter. However, if the master tractor 1P and the slave tractor 1C have different specifications, the specifications of the master tractor 1P and the slave tractor 1C are registered, and parameter conversion is performed by the parameter conversion unit 83, in which the operation content of the master tractor 1P is associated with the corresponding operation content of the counterpart slave tractor 1C.

The generated work/driving parameter is transmitted to the slave machine control unit 7 via the communication module 60 in the state of being linked or linkable with the target position calculated by the slave traveling target calculation unit 65.

The slave machine control unit 7 includes a communication module 70, the slave position detection module 71, and a navigation control unit 72. Similarly to the master position detection module 61, the slave position detection module 71 uses GPS to detect its own position, that is, the position of the slave tractor 1C. The acquired positional data on the slave tractor 1C is transmitted, for use in checking the position of the slave tractor 1C on the master machine control unit 6 side, to the master machine control unit 6 via the communication module 70. The navigation control unit 72 controls the steering orientation of the front wheels 2*a* of the slave tractor 1C and driving of the rear wheels 2*b* thereof based on the target traveling position wirelessly transmitted from the master machine control unit 6, and navigates the slave tractor 1C in an unmanned manner to target traveling positions that are set sequentially. Furthermore, at the time when the slave tractor 1C has arrived at the target traveling position with which the work/driving parameter is linked, the navigation control unit 72 executes the traveling-system operation or work-system operation that is included in the work/driving parameter, so as to change the traveling speed of the slave tractor 1C or perform raising and lowering control of the work implement 5 using the lifting mechanism 4.

Figure 6:
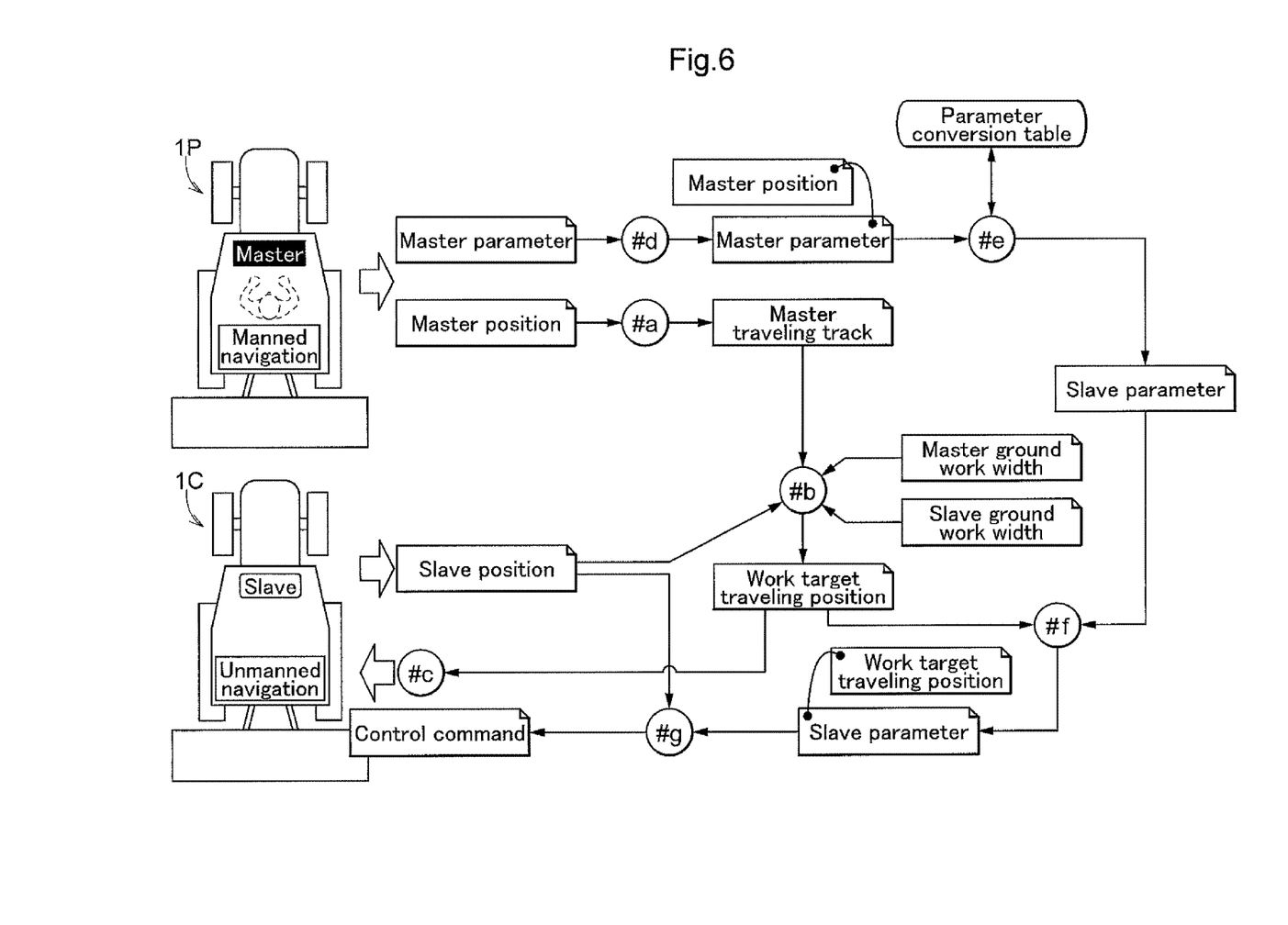
FIG. 6 is a schematic diagram illustrating a basic flow of control data in straight work traveling.
Figure 7:
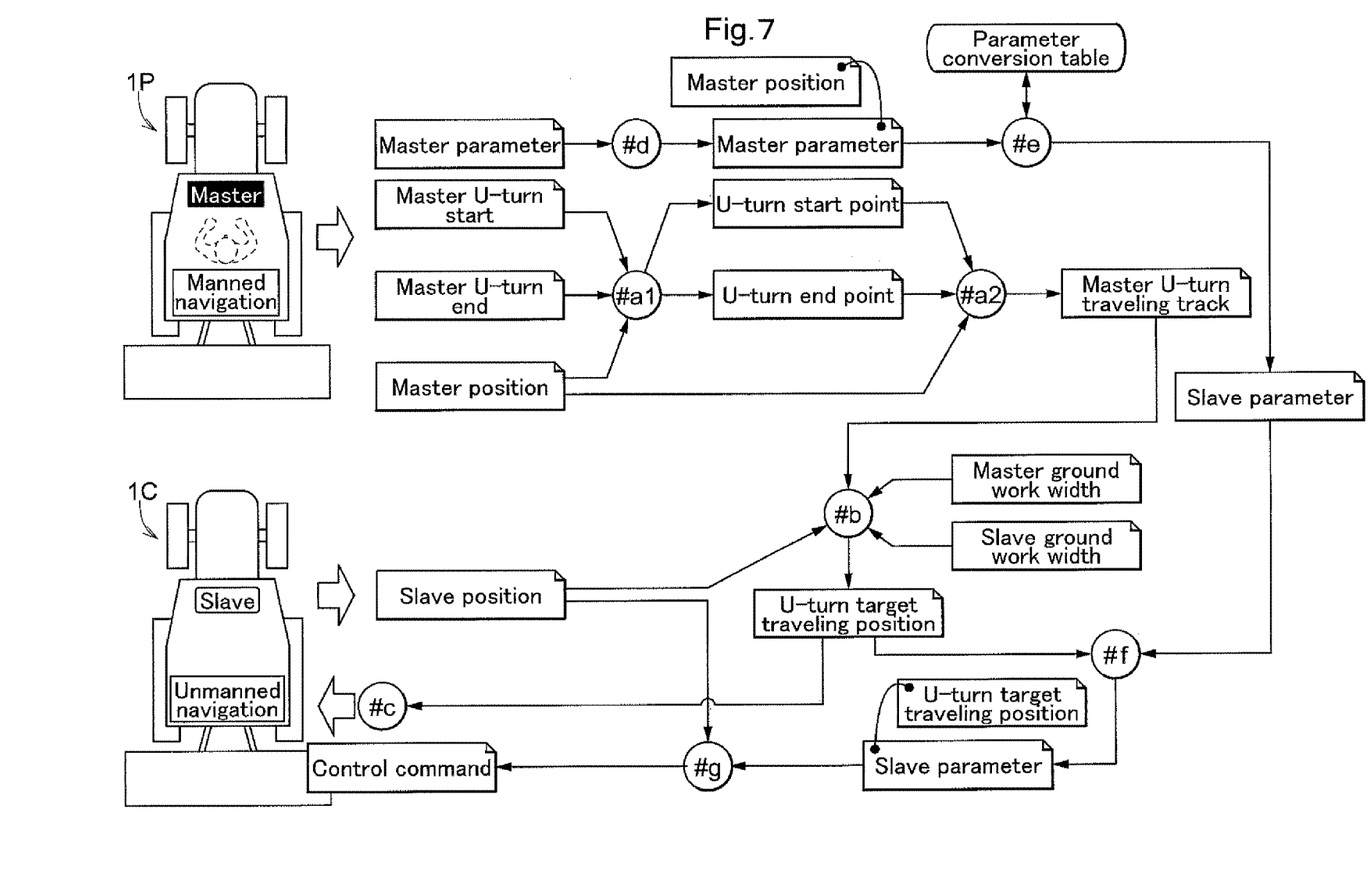
FIG. 7 is a schematic diagram illustrating a basic flow of control data in U-turn traveling.
Figure 8:
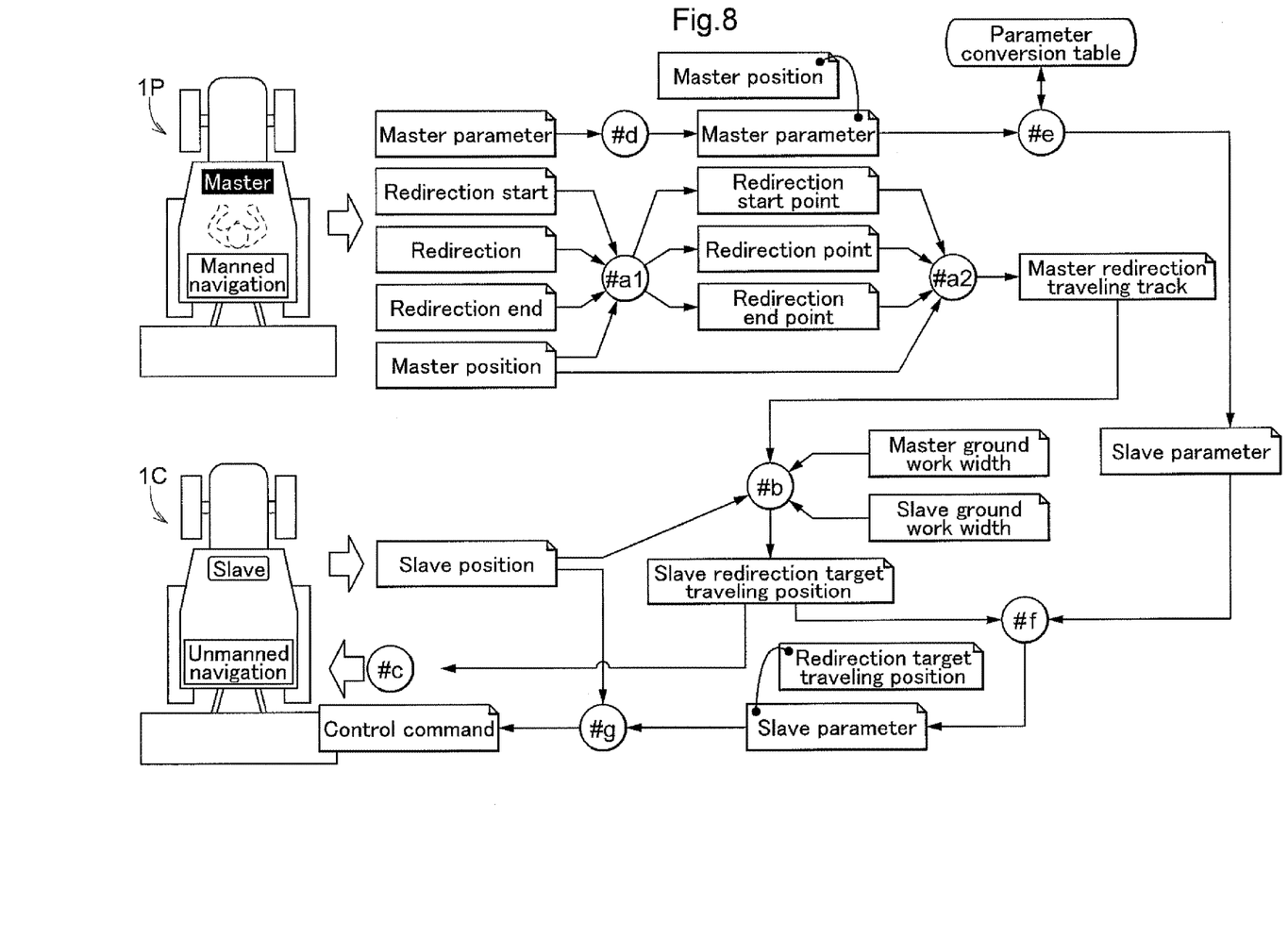
FIG. 8 is a schematic diagram illustrating a basic flow of control data in redirection traveling.

The following will describe the basic flows of control data in the cooperation control between the manned-navigation type master tractor 1P and the unmanned-navigation type slave tractor 1C with reference to FIGS. 6, 7, and 8. FIG. 6 schematically shows the flow of control data in the cooperation control for work traveling that leaves a substantially straight traveling track. FIG. 7 schematically shows the flow of control data in the cooperation control for U-turn traveling. FIG. 8 schematically shows the flow of data in the cooperation control for redirection traveling.

As shown in FIG. 6, in the cooperation control for the work traveling that leaves a straight traveling track, a master tractor traveling track (master traveling track) is calculated based on master tractor positions (master positions) indicating the actual traveling positions of the master tractor 1P that were generated in a predetermined sampling period (#a). Based on the calculated master tractor traveling track and a slave tractor position (slave position) that indicates the actual traveling position of the slave tractor 1C at each time, the work target traveling position for the slave tractor 1C is calculated with further consideration given to the work width of the master work vehicle, the work width of the slave work vehicle, and the amount of overlap in the work width of both vehicles (#b). This calculated work target traveling position data serves as a navigation control target value, and the slave tractor 1C is navigated in an unmanned manner so as to perform ground work with a wide width in cooperation with the master tractor 1P (#c).

If a traveling-system operation or a work-system operation is executed by a driver during work traveling of the master tractor 1P, a work/driving parameter (master parameter) indicating this operation content of this master tractor 1P is generated, and is linked with the master position at the time of the operation (#d). The work/driving parameter linked with the master position is converted into a work/driving parameter (slave parameter) that is appropriate for the slave tractor 1C using the parameter conversion table of the parameter conversion unit 84 (#e). The converted slave parameter is linked with the corresponding work target traveling position (#f). When the slave tractor 1C arrives at the traveling position at which the operation based on this slave parameter is to be executed, the slave parameter is converted into a control command for the operation (#g), and a traveling-system operation device or a work-system operation device is controlled in accordance with this control command. Accordingly, substantially straight work traveling of the slave tractor 1C that emulates the master tractor 1P is realized.

As shown in FIG. 7, in the cooperation control in the U-turn traveling, which is redirection at the time of back and forth work traveling, a U-turn start point P1 and a U-turn end point P2 of the master tractor 1P are calculated based on a U-turn start operation and a U-turn end operation of the master tractor 1P that are each associated with the master position (#a1). Furthermore, a U-turn traveling track (master U-turn traveling track) of this master tractor 1P is calculated based on the U-turn start point P1, the U-turn end point P2, and the master positions in the traveling therebetween (#a2). Furthermore, a U-turn target traveling position for the slave tractor 1C is calculated based on the master U-turn traveling track, taking into consideration the master work width, the slave work width, and the amount of overlap between them (#b). This calculated slave U-turn target traveling position serves as a navigation control target value, and the slave tractor 1C is navigated in an unmanned manner so as to perform U-turn traveling (#c).

Note that also in this U-turn traveling, when a traveling-system operation or a work-system operation is executed by a driver during the U-turn traveling of the master tractor 1P, a work/driving parameter (master parameter) indicating this operation content is generated, and is linked with the master position at the time of the operation (#d). The work/driving parameter linked with the master position is converted into the work/driving parameter (slave parameter) that is appropriate for the slave tractor 1C (#e). The converted slave parameter is linked with the corresponding U-turn target traveling position (#f). When the slave tractor 1C arrives at the traveling position at which the operation based on this slave parameter is to be executed, the slave parameter is converted into a control command for the operation (#g), and a traveling-system operation device or a work-system operation device is controlled in accordance with this control command. Accordingly, U-turn traveling of the slave tractor 1C that emulates the master tractor 1P is realized.

As shown in FIG. 8, in the cooperation control of the redirection traveling in the loop work area, a redirection traveling start point Pp1, a redirection point (forward/backward switching point) Pp2, and a redirection traveling end point Pp3 of the master tractor 1P are calculated based on the redirection start operation, the redirection stop operation, and redirection end operation of the master tractor 1P that are each associated with the master position (#a1). Furthermore, a redirection traveling track (master redirection traveling track) of this master tractor 1P is calculated based on the redirection traveling start point Pp1, the redirection point Pp2, the redirection traveling end point Pp3, and the master positions in the traveling therebetween (#a2). Furthermore, a redirection target traveling position for the slave tractor 1C is calculated based on the master redirection traveling track, taking into consideration the work width of the master work vehicle, the work width of the slave work vehicle, and the amount of overlap between them (#b). This calculated slave redirection target traveling position serves as a navigation control target value, and the slave tractor 1C is navigated in an unmanned manner so as to perform redirection traveling (#c). Note that in FIG. 8, the redirection traveling start point is indicated simply as "redirection start point", and the redirection traveling end point is indicated simply as "redirection end point".

Also in this redirection traveling, similarly to the foregoing U-turn traveling, when a traveling-system operation or a work-system operation is executed by a driver during redirection traveling of the master tractor 1P, a work/driving parameter (master parameter) indicating this operation content is generated, and is linked with the master position at the time of the operation (#d). The work/driving parameter linked with the master position is converted into the work/driving parameter (slave parameter) that is appropriate for the slave tractor 1C (#e), and the converted slave parameter is linked with the corresponding work target traveling position (#f). When the slave tractor 1C arrives at the traveling position at which the operation based on this slave parameter is to be executed, the slave parameter is converted into a control command for the operation (#g), and a traveling-system operation device or a work-system operation device is controlled in accordance with this control command. Accordingly, redirection traveling of the slave tractor 1C that emulates the master tractor 1P is realized.

Other Embodiments (1) Although only one slave tractor 1C is used in the above-described embodiment, the present invention is applicable to a plurality of slave tractors 1C using a similar control method. In this case, if there are two slave tractors 1C, two following control methods are possible. In one of the methods, a first slave tractor 1C is controlled to follow the track of the master tractor 1P with consideration given to the work width of the master tractor 1P, and a second slave tractor 1C is controlled to follow the track of the master tractor 1P with consideration given to the work width of the first slave tractor 1C as well. In the other of the methods, the first slave tractor 1C is controlled to follow the track of the master tractor 1P, and the second slave tractor 1C is controlled to follow the first slave tractor 1C serving as the master tractor 1P. That is, in the case where there are a plurality of slave tractors 1C, following control in which the preceding slave tractor 1C serves as the master tractor 1P is also possible.

(2) In the above-described embodiment, the master tractor 1P is of a manned-navigation type, but this master tractor 1P may be operated in an unmanned manner by employing a program control method or a remote-control method. The present invention is applicable to a form in which the master tractor 1P, that is, the master work vehicle is also operated in an unmanned manner. Furthermore, in the present invention, both the master tractor 1P and the slave tractor 1C are manned tractors. For example, if the master tractor 1P is operated by a person of experience, the slave tractor 1C is operated by a person with less experience, and parts of a traveling-system operation and a work-system operation of the slave tractor 1C are executed based on the work/driving parameter generated by the master tractor 1P, the burden of the person with less experience will be reduced.

(3) Although, in the above-described embodiment, the tractor on which the cultivation apparatus 5 is mounted is given as an example of a work vehicle, the characteristics of the present invention can be used advantageously even in the case where instead of the cultivation apparatus 5, another working apparatus such as a sprinkling apparatus or a fertilizing apparatus is mounted. Furthermore, the present invention is also applicable to another work vehicle, such as, civil engineering and construction machinery, for example, a combine, a rice-planting machine, a lawnmower, a weeding machine, or a bulldozer. Furthermore, the master work vehicle 1P and the slave work vehicle 1C do not necessarily need to be of the same type, and a combination of, for example, a combine and a conveying truck, or the like is also possible.

INDUSTRIAL APPLICABILITY

The present invention is applicable to a control system in which a plurality of work vehicles perform work traveling in cooperation with each other.

DESCRIPTION OF REFERENCE SIGNS

1P: Master work vehicle (master tractor)
1C: Slave work vehicle (slave tractor)
61: Master position detection module
62: Master traveling track calculation unit
63: U-turn control module
64: Loop traveling control module
65: Traveling target calculation unit
7: Slave machine control unit
70: Communication module
71: Slave position detection module
72: Navigation control unit
8: Work/driving parameter management module
81: Master parameter generation unit
82: Slave parameter generation unit
83: Parameter conversion unit

What is claimed is:

1. A work vehicle cooperation system in which a master work vehicle and an unmanned-navigation type slave work vehicle that emulates the master work vehicle perform ground work using a work implement, comprising:
   a master position detection module that detects a master position, which is a position of the master work vehicle;
   a slave position detection module that detects a slave position, which is a position of the slave work vehicle;
   a master traveling track calculation unit that calculates a traveling track of the master work vehicle based on the master position;
   a slave traveling target calculation unit that calculates a target traveling position of the slave work vehicle based on the traveling track of the master work vehicle;
   a master parameter generation unit that generates a master work parameter relating to work executed by the master work vehicle and a master driving parameter relating to driving executed by the master vehicle, the master work parameter and the master driving parameter being linked with the master position;
   a slave parameter generation unit that generates a slave work parameter and a slave driving parameter for the slave work vehicle based on the master work parameter and the master driving parameter, the slave work/driving work parameter and the slave driving parameter being linked with the corresponding target traveling position of the slave work vehicle; and
   a navigation control unit that navigates the slave work vehicle in an unmanned manner based on the slave position, the target traveling position, the slave work parameter, and the slave driving parameter.

2. The work vehicle cooperation system according to claim 1, wherein the master and slave driving parameters include a traveling control parameter that relates to an operation of a traveling system including a gearbox and braking device, and wherein the master and slave work parameters include a work control parameter that relates to a working operation and a non-working operation with respect to the work implement.

3. The work vehicle cooperation system according to claim 1, wherein the slave parameter generation unit is provided with a parameter recording device in which a parameter of the master work vehicle and a parameter of the slave work vehicle are recorded, and generates the slave work parameter and the slave driving parameter by correcting the master work parameter and the master driving parameter based on a difference between the parameter of the master work vehicle and the parameter of the slave work vehicle.

4. The work vehicle cooperation system according to claim 1, wherein the slave traveling target calculation unit calculates a target traveling position of the slave work vehicle based on a ground work width of the master work vehicle, a ground work width of the slave work vehicle, and the traveling track of the master work vehicle, and the navigation control unit navigates the slave work vehicle in an unmanned manner based on the target traveling position, so that the slave work vehicle follows a ground work track of the master work vehicle.

5. The work vehicle cooperation system according to claim 1,
wherein the slave position detection module and the navigation control unit are mounted on the slave work vehicle,
the master position detection module, the master traveling track calculation unit, the slave traveling target calculation unit, the master parameter generation unit, and the slave parameter generation unit are mounted on the master work vehicle, and
the slave work vehicle and the master work vehicle are connected to each other so as to be capable of data transmission.

6. The work vehicle cooperation system according to claim 1,
wherein the slave position detection module and the navigation control unit are mounted on the slave work vehicle,
the master position detection module and the master parameter generation unit are mounted on the master work vehicle,
the master traveling track calculation unit, the slave traveling target calculation unit, and the slave parameter generation unit are constructed in a separate control unit, and
the separate control unit, the slave work vehicle, and the master work vehicle are connected to one another so as to be capable of data transmission.

7. The work vehicle cooperation system according to claim 1, wherein the master work vehicle is a vehicle operable by an operator.

* * * * *

UNITED STATES PATENT AND TRADEMARK OFFICE
CERTIFICATE OF CORRECTION

PATENT NO. : 9,839,174 B2  
APPLICATION NO. : 14/774266  
DATED : December 12, 2017  
INVENTOR(S) : Yoshitomo Fujimoto et al.

Page 1 of 1

It is certified that error appears in the above-identified patent and that said Letters Patent is hereby corrected as shown below:

Column 14, Line 42-43, Claim 1, after "slave" delete "work/driving".

Signed and Sealed this  
Sixth Day of March, 2018

Andrei Iancu  
*Director of the United States Patent and Trademark Office*